Jan. 13, 1970   J. J. GLASSMEYER   3,489,395

LUBRICATED TRAILER PROP

Filed Aug. 24, 1967

EXTENDED

RETRACTED

Inventor
John J. Glassmeyer

By Richard J. Myers
Attorney

United States Patent Office 3,489,395
Patented Jan. 13, 1970

3,489,395
LUBRICATED TRAILER PROP
John J. Glassmeyer, Covington, Ky., assignor to Pullman Incorporated, Chicago, Ill., a corporation of Delaware
Filed Aug. 24, 1967, Ser. No. 662,957
Int. Cl. B60s 9/08, 9/22
U.S. Cl. 254—86                                   7 Claims

ABSTRACT OF THE DISCLOSURE

A lubricated prop arrangement for trailers, such as semitrailers or the like, comprising a fixed outer leg post reciprocally connected with an inner movable inner sleeved leg portion, the post portion carrying depending screw means inwardly of said outer sleeve and cooperative with the movable leg portion and extendable inwardly into the sleeve leg portion and cooperative with an inner sleeve entrained nut which travels up and down the power screw for extending and retracting of the inner leg element relative to the outer leg element, and a lubrication jacket being disposed within the inner sleeve and about the screw and having port means communicating with an upper closed reservoir communicable with the lubrication jacket to allow for transfer of lubricant from the lower jacket to the upper chamber and thereby maintain sufficient lubrication about the screw and nut arrangement.

BACKGROUND OF THE INVENTION

Field of the invention

This invention relates to prop or landing gear construction for supporting the front end of road vehicles, particularly a vehicle such as a semitrailer, which is left positioned for loading and unloading, after detachment from the tractor. The invention contemplates certain improvements in props of the telescoping, tubular type involving the supplying of lubricant to the operating components thereof.

Description of the prior art

Lubrication of trailer prop or landing gear construction has heretofore been known, as for instance shown by U.S. Patent No. 2,499,625. As shown in that particular patent, the landing gear construction provided for a rotatable nut and vertically reciprocal screw arrangement and lubrication was provided for both the nut and the screw. However, where the nut moves relative to a non-reciprocating type screw and carries the extendable leg portion of the landing gear, a problem exists when the lower or inner leg of the prop is left extended for any length of time, as the lubricant finds its way to the bottom of the inner leg leaving the jackscrew and the nut starved for lubrication. This invention insures that lubricant is retained in the immediate area of the jackscrew nut regardless of location of the nut with reference to the bottom of the jackscrew.

SUMMARY

The invention has for its objective, purpose and advantage the providing of continuous lubrication to the nut and screw mechanism of the landing gear structure of the road vehicle such as a semitrailer. Where the nut is carried by and moved with the movable inner sleeve or leg portion of the extendable landing gear or jack assembly, a lubrication tube is provided for extension about the screw and attached to the nut and the nut is ported to allow for fluid or lubricant to be stored above the nut in a reservoir as the lower inner leg extends outwardly of the landing gear unit. By such an arrangement the landing gear nut and screw parts are always exposed to lubricant. These and other objects, purposes and advantages will become apparent from reference to the following description, accompanying drawings and attached claims.

DESCRIPTION OF THE PREFERRED EMBODIMENT

Figure 1:
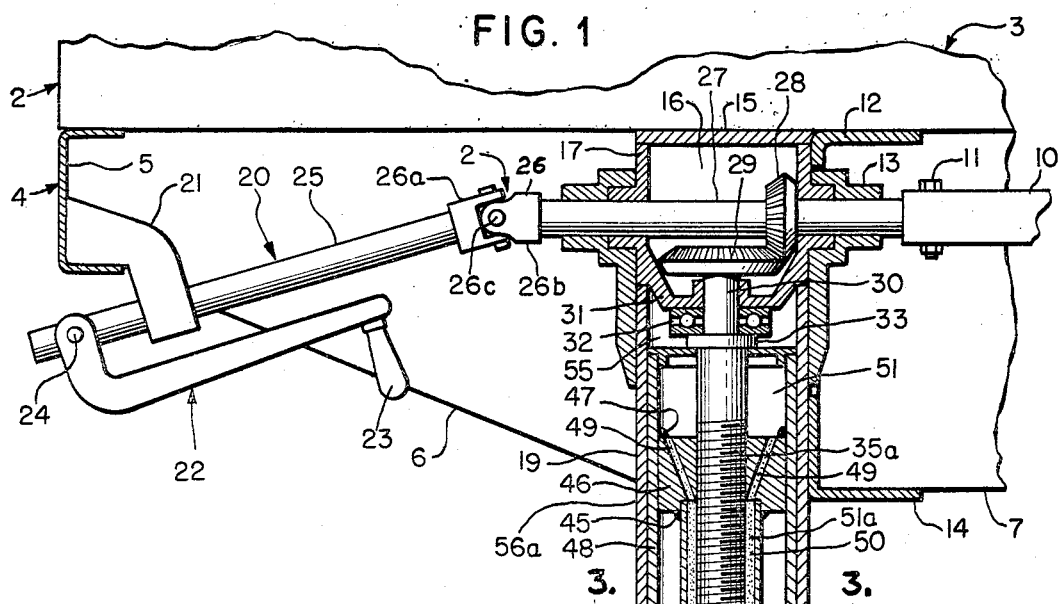
FIG. 1 is a partial cross sectional view of a trailer provided with the novel lubricated landing gear construction of the invention with the landing gear construction in the retracted position.

In the construction of trailer props, a pair of telescoping, tubular posts or landing gear arrangements are disposed in a vertical position on the under side of the trailer body. These post assemblies are strong and rigid and are attached to the trailer body. This arrangement is conventinal for semitrailers, as for instance shown in U.S. Patent No. 2,499,625. For simplicity purposes only one of these landing gear or prop arrangements or units 9 is shown as being attached to the trailer 2 having a body or container portion 3 and an underframe 4. The underframe 4 is in the form of longitudinally extending U-shaped channels, one channel or frame 5 only being shown coupled to cross bearer means 6. Cross framing 7 extends between and is connected to each landing gear arrangement 9 of which only one is shown. The landing gear construction or arrangement comprises the landing gear units or props 9 only one of which is shown. The landing gear unit or prop 9 cooperates with the other unit through the means of the common power shaft 10 carried by bearing 11 and the body 3 is provided with an underframe brace 12 from which depends housing part 13 of the landing gear unit 9 which is provided with a brace 14 connecting with the cross framing 7. The landing gear unit or prop 9 is further provided with a top plate 15 attached to the underside of the body or container 3. The interior 16 of the housing 13 of the landing gear unit 9 is further defined by a casing bearing 17. An outer leg or sleeve element 19 depends from the housing part and case bearing 17.

A crank arrangement 20 for operating the landing gear unit 9 of the landing gear construction 8 comprises an L-shaped handle 22 having a handle arm 23 and is pivotally attached to crank arm 25 by pivot 24, the arm 25 being held to the channel member 5 by support 21. The crank arm 25 is connected with the crank driven shaft or driving shaft 27 by universal connecting structure 26 having coupling parts 26a and 26b connected by universal pin means 26c. The shaft 27 operates bevel gears 28 and 29 to operate driving pin 30 carried in bearing arrangement 32 and having spacer 33 from which depends the jackscrew assembly 34 including the jackscrew 35 having an upper end part 35a and a lower end part 35b.

Figure 3:
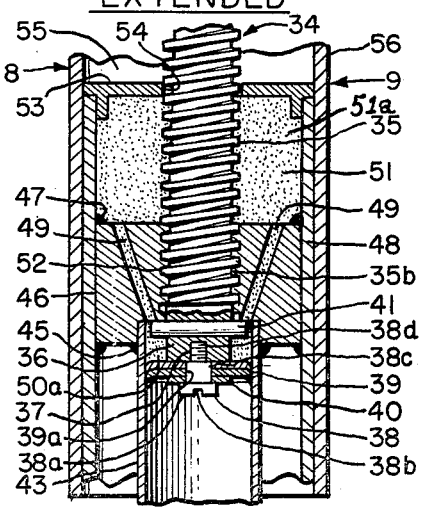
FIG. 3 is a sectional view taken along line 3—3 of FIG. 1.

The jackscrew 35 (see FIGS. 1 through 3) is provided with threads and has a bottom end reduced end portion 36 which has a threaded bore 37 receiving shoulder screw 38 having a head portion 38a, a screwdriver receiving slot 38b, a retaining block part 38c, and a threaded part 38d extendible into the threaded bore 37. The fastening screw 38 holds thereon seals 39 extending through the seal openings 39a. A steel retaining washer 40 is carried on the screw 38 adjacent the screw head 38a and a down stop pin 41 is carried by the upper part of the lower end 36. The threaded screw 35 and the shoulder screw 38 are surrounded by a thin metal lubricant tube 43 which at the lower end thereof is provided with an end cap 42 and an air vent 44 communicating with the air space 44a therein. The round tube 43 has an upper portion that extends within the lower part of a nut 46 and is held to the nut 46 by weld 45. The nut 46 is in turn held to the lower inner leg tube or sleeve 48 by weld 47. Holes 49 are provided in the nut 46 and act as passage means communicating with the lower lubricant chamber 50 as defined by the tube 43 and the screw 35, the chamber 50 having a volume 50a below the stop pin 41. The passage means 49 also communicates with a closed reservoir 51 for receiving the lubricant 51a. The nut 46 has a threaded bore 52 which receives the screw 35, the nut 46 being reciprocally movable lengthwise of the screw 35 and carrying the inner sleeve element 48 between the extended and retracted positions. The closed reservoir 51 is defined by a top cover 53 which is integral with the sleeve 48 and movable therewith.

The outer fixed leg 19 is defined by an outer rectangular shaped tube or sleeve portion 56 having an upper part 56a and a lower part 56b and opened at its bottom. The bottom plate 57 is attached to inner tube 48 and depends ground engagement wheel or roller support 58 provided with the pin 59 to carry the arm structure 60 supporting the ground engagement means or landing gear wheels 61.

The crank arrangement 20 operates the bevel gears 28 and 29 to rotate the screw 35 which in turn reacts on the square shape or rectangular shaped nut 46 which moves in a vertical linear path relative to the screw for extension and retraction of the prop assembly or landing gear unit 9, as the nut is fixed to the inner rectangular shaped tube 48 which then moves relative to the outer rectangular shaped sleeve or element 19 extending about the inner leg portion 48.

Figure 2:
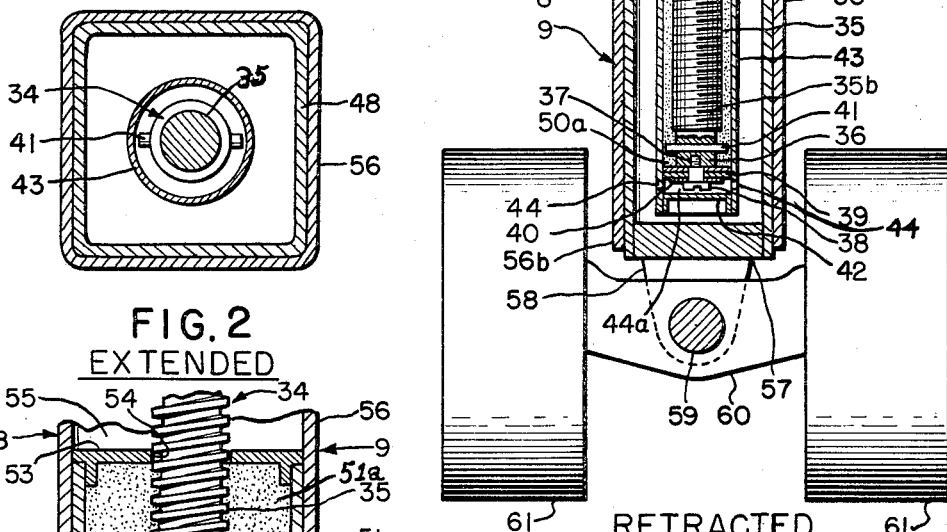
FIG. 2 is a partial view of the landing gear construction of the invention as shown in FIG. 1 but in the extended position.

As seen in FIG. 1, the landing gear unit 9 is shown in the retracted position with the nut 46 and its associated inner sleeve leg 48 being retracted within the outer leg assembly 19. In the retracted position the landing gear wheels 61 are held in their uppermost position. FIG. 2 shows the landing gear unit 9 in the extended position and this is the situation where the landing gear wheels are extended all the way outwardly of the landing gear assembly 9, the landing gear nut and inner tube 48 being extended outwardly of the unit 19 as far as possible. In the extended position the nut is at the lowermost part of the screw 35 and engaging the stop pin 41 in the fully extended position. In the fully retracted position, the nut is the farthest upward distance away from the stop 41 and the seals 39 and the space or chamber 50 is full of lubricant up to the upper surface of the nut 46. As the nut is moved along the screw 35 the chamber 50 becomes progressively reduced and the oil or lubricant is forced through the openings or passages 49 into the upper closed reservoir 51. When the nut 46 moves to the stop pin 41 and seats thereagainst, the chamber 50 has virtually disappeared with the exception of its lower portion 50a which is below the stop pin 41 and all of the oil has been delivered into the passages 49 and into the closed chamber or reservoir 51 which is sufficiently large to receive all of the lubricant or oil. Thus it is seen that there is always supplied to the nut 46 and the screw 35, in the areas where they cooperate with one another in extending and retracting the unit 9, sufficient lubrication or oil which is vitally necessary to the operation of the landing gear assembly 9. The seals 39 prevent any lubricant from passing from the chamber 50 into the area 50a and the vents 44 permit breathing of air in and out of the chamber 50a and into the space between the lubricant tube 43 and the inner sleeve 48. Thus, in retracting of the prop assembly 9, the screw seals cooperate with the screw 35 to force the oil up in a piston-like fashion into the upper closed and volumely fixed reservoir 51. When the unit is allowed again to retract, the lubricant or oil passes from the reservoir 51 through the openings 49 and into the passage or chamber 50 due to gravity or suction or both. At no point in the stroke of the landing gear assembly 9 is the screw 35 or the nut 46 engaging areas not lubricated, no matter how long the trailer stands with the landing gear unit 9 fully extended, fully retracted, or at some intermediate position, as long as the seals 39 maintain a tight fit against the wall of the lubricant tube 43. Tolerances on the seals 39, washer 40 and shoulder screw 38 are such that the seals 39 are subjected only to translation and not to rotation.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A prop for trailers comprising:
    two tubular telescoping members, one of said members being fixed and the inner of said members being extendible relative to the outer member and carrying ground engagement means for supporting the trailer,
    an actuating screw means carried by the outer member and extending within both members in generally vertical position,
    nut means carried on the inner member and cooperatively engaging with said actuating screw means for relative movement between the members,
    an annular lubrication bearing jacket connecting with said nut means and extending within said inner member and about said screw means and defining with said inner member and said screw means a lubrication chamber communicating with the nut means, and
    a lubrication reservoir disposed in the inner member above said nut in communication with the nut means and port means in said nut means communicating said chamber with said reservoir.

2. A landing gear arrangement for semi-trailers and the like comprising:
    an outer fixed rectangular sleeve member for fixed attachment to the trailer and having extendible therethrough and therein a fixed drive means adapted for rotational movement,
    a reciprocally disposed inner rectangular sleeve reciprocally disposed within said outer sleeve member and carrying ground engagement means, said inner sleeve member forming the extendible leg portion of said landing gear,
    said inner sleeve member fixedly carrying driven means threadably engageable with said drive means for reciprocally vertically moving said inner sleeve relative to said outer sleeve member,
    a lubrication jacket disposed within said inner sleeve member and fixedly attached to said driven means and extending downwardly in the lower part of said inner sleeve member,
    a closed reservoir fixed to said inner sleeve member and to said driven means and disposed over said drive means, said reservoir having an opening in said top for extension of said drive means therethrough,
    port means in said driven means communicating said lubricating jacket with said reservoir, and
    said drive means and said lubricating jacket defining a chamber and port means in said driven means communicating said chamber with said reservoir.

3. A landing gear structure for a vehicle comprising:
    a pair of inner and outer relatively reciprocal landing gear leg sleeve elements, and
    drive means disposed within said sleeve elements and operatively connected with each of said elements for retracting and extending one of the elements driven means having lubrication means carried thereby, said lubrication means being in the form of a jacket disposed about said drive means for supply of lubrication thereto.

4. The invention according to claim 3, and
said drive means comprising a vertically elongated drive element operatively connected with one sleeve element,
a driven element operatively connected with the other sleeve element,
said lubricating jacket defining with the drive element a lubrication receiving chamber, and
a lubrication reservoir disposed above said driven element and port means within said driven element for lubrication communication between said chember and said reservoir.

5. The invention according to claim 4, and
said drive element comprising an elongated screw within each of the sleeve elements, and
said driven element comprising a nut disposed about said screw in threaded relation therewith.

6. The invention according to claim 4, and
said drive element having sealing means at one end thereof engageable with said jacket and causing said drive element to act as a piston for removing lubricant through said jacket chamber and said passage into said reservoir.

7. The invention according to claim 4, and
said drive element being provided with a stop in limiting downward movement of said driven element to limit the amount of extension of said one sleeve element relative to said other sleeve element.

References Cited

UNITED STATES PATENTS

| | | | |
|---|---|---|---|
| 2,352,117 | 6/1944 | Pasternack | 254—98 |
| 2,420,219 | 5/1947 | Baldwin. | |
| 2,499,625 | 3/1950 | Black | 254—86 |
| 2,708,374 | 5/1955 | Engh | 74—424.8 |
| 3,007,677 | 11/1961 | Dalton | 254—86 |

ROBERT C. RIORDON, Primary Examiner

D. R. MELTON, Assistant Examiner

U.S. Cl. X.R.

74—467